United States Patent [19]

Weston et al.

[11] Patent Number: 4,485,078

[45] Date of Patent: Nov. 27, 1984

[54] PROCESS FOR PRODUCING WET PROCESS PHOSPHORIC ACID FROM PHOSPHATE ROCKS CONTAINING FLUOCHLORAPATITE AND RELATED MINERALS

[75] Inventors: Charles W. Weston, Prairieville; John W. Wen; Frederick S. Mandel, both of Baton Rouge, all of La.

[73] Assignee: Agrico Chemical Company, Tulsa, Okla.

[21] Appl. No.: 471,421

[22] Filed: Mar. 8, 1983

Related U.S. Application Data

[63] Continuation-in-part of Ser. No. 358,613, Mar. 16, 1982, abandoned.

[51] Int. Cl.³ .............................................. C01B 25/16

[52] U.S. Cl. .................................... 423/320; 423/167; 423/319; 423/321 R

[58] Field of Search ................... 423/319, 320, 321 R, 423/166, 167

[56] References Cited

U.S. PATENT DOCUMENTS

| | | | |
|---|---|---|---|
| 3,361,527 | 1/1968 | Hinkebein | 423/308 |
| 3,442,609 | 5/1969 | Carothers et al. | 423/321 R |
| 3,479,139 | 11/1969 | Koerner | 423/321 R |
| 3,494,736 | 2/1970 | Carothers et al. | 423/116 |
| 3,497,330 | 2/1970 | Baniel | 423/321 R |
| 4,026,999 | 5/1977 | Czysch et al. | 423/320 |
| 4,277,454 | 7/1981 | Long et al. | 423/320 |
| 4,325,927 | 4/1982 | Weston et al. | 423/310 |
| 4,367,197 | 1/1983 | Long et al. | 423/320 |

FOREIGN PATENT DOCUMENTS

| | | | |
|---|---|---|---|
| 1020015 | 2/1966 | France | 423/321 R |
| 1263692 | 2/1972 | France | 423/320 |

*Primary Examiner*—Gregory A. Heller
*Attorney, Agent, or Firm*—Richards, Harris & Medlock

[57] ABSTRACT

Phosphoric acid is produced by the wet process from phosphate rock containing fluochlorapatite. The rock is ground in a crusher (10) to a size such that from about 50% to about 90% by weight will be passed by a −200 mesh U.S.S. sieve before being passed into a digestor (14) where it is mixed with sulfuric acid and recycled phosphoric acid to form a slurry. A suitable reductant such as sulphur dioxide is added to the slurry to maintain the oxidation-reduction potential in the range from about +150 mv to about +750 mv. The gypsum by-products are then removed from the slurry at filter (16) and a portion of the acid is recycled to digestor (14). The remaining acid is either concentrated and further processed to make fertilizers or is further processed via path (20) to remove aluminum and/or iron impurities. Select amounts of fluoride and sodium containing compounds are added to the acid in a stirred reactor (30) to cause precipitation of aluminum, principally as $Na_2AlF_5$. After about 15 to about 60 minutes of stirring at a temperature below about 70° C., the precipitate is removed at filter (32) where the acid is either processed to make fertilizer or subjected to additional processing to remove iron contaminants. Iron contaminants are removed from the filter acid or from aluminum removed acid from filter (32) by adding sufficient ammonia to the acid in a stirring reactor (40) to cause precipitation of iron principally as $NH_4Fe_2H_8(PO_4)_5.AH_2O$, to reduce the level of iron to desired levels. After aging in the reactor from about 2 to about 24 hours at a temperature below the boiling point of the acid, the precipitate is removed at filter (42) and the resulting iron reduced acid is concentrated and subjected to conventional processing for making fertilizers.

50 Claims, 1 Drawing Figure

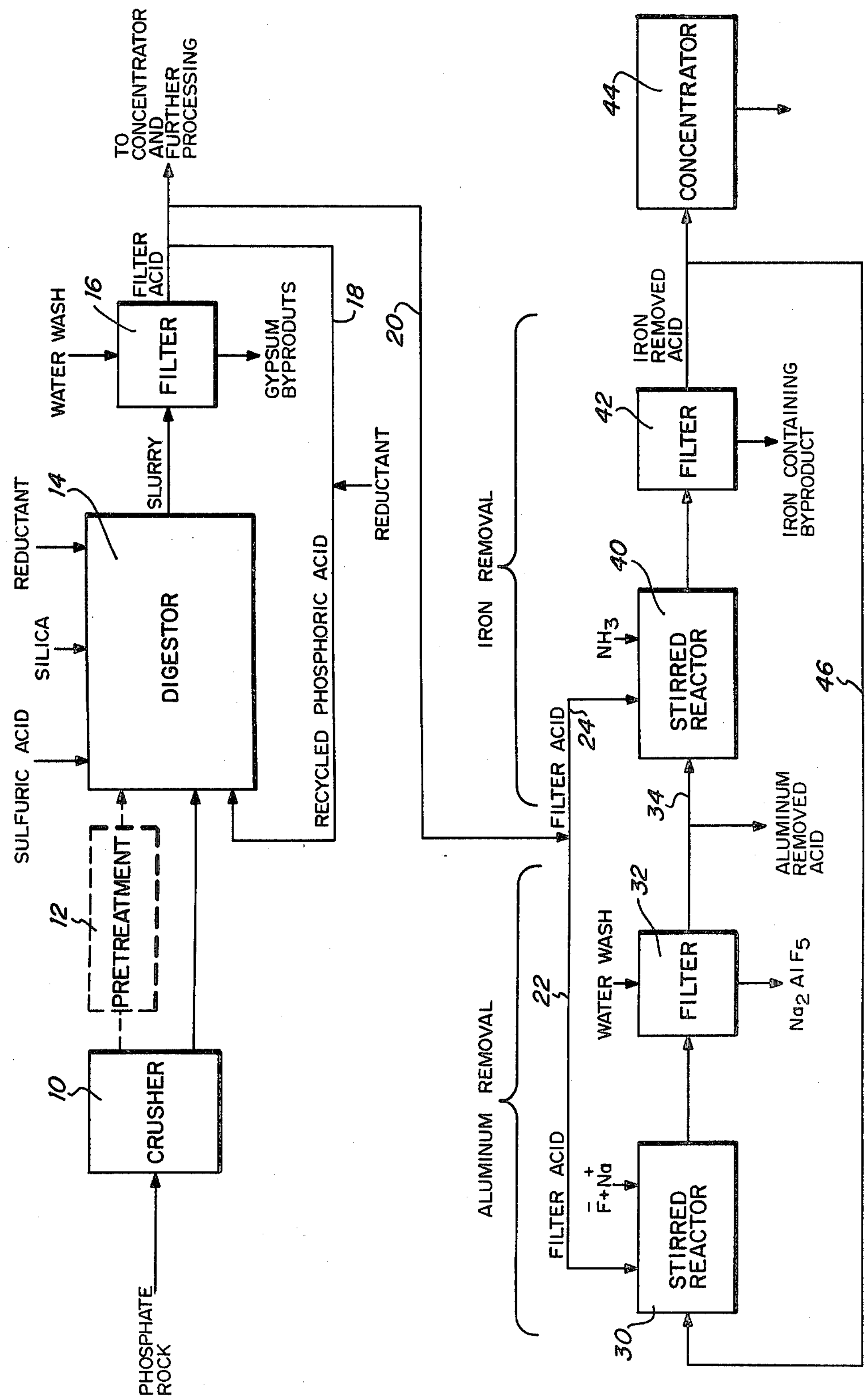
PHOSPHATE ROCK
CRUSHER
10
PRETREATMENT
12
SULFURIC ACID
SILICA
REDUCTANT
DIGESTOR
14
SLURRY
WATER WASH
FILTER
16
GYPSUM BYPRODUTS
FILTER ACID
TO CONCENTRATOR AND FURTHER PROCESSING
RECYCLED PHOSPHORIC ACID
REDUCTANT
18
20
ALUMINUM REMOVAL
FILTER ACID
$\bar{F}+\overset{+}{Na}$
STIRRED REACTOR
30
22
WATER WASH
FILTER
32
$Na_2AlF_5$
ALUMINUM REMOVED ACID
34
FILTER ACID
24
IRON REMOVAL
$NH_3$
STIRRED REACTOR
40
FILTER
42
IRON CONTAINING BYPRODUCT
IRON REMOVED ACID
46
CONCENTRATOR
44

PROCESS FOR PRODUCING WET PROCESS PHOSPHORIC ACID FROM PHOSPHATE ROCKS CONTAINING FLUOCHLORAPATITE AND RELATED MINERALS

CROSS REFERENCE TO RELATED APPLICATION

This application is a continuation-in-part of copending application for U.S. patent Ser. No. 358,613, filed Mar. 16, 1982, now abandoned.

TECHNICAL FIELD

The present invention pertains to the manufacture of phosphoric acid by the wet process method, and more particularly to the manufacture of phosphoric acid from rock containing fluochlorapatite and other mineral species containing excessive iron or aluminum not encountered in presently exploited phosphate deposits.

BACKGROUND ART

In the wet process method of producing phosphoric acid, phosphate rock and sulfuric acid are reacted under conditions which result in the formation of reaction products, phosphoric acid and gypsum, in accordance with the chemical equation:

$$Ca_{10}(PO_4)_6F_2+10H_2SO_4+20H_2O=10CaSO_4.2H_2O+6H_3PO_4+2HF$$

As this equation indicates, the major mineral usually present in most conventional phosphate rocks is a fluoride containing species which yields hydrofluoric acid during the reaction. The hydrofluoric acid then reacts with active silica normally present in the rock to give hydrofluosilicic acid according to the following general chemical equation:

$$6HF+SiO_2=H_2SiF_6+2H_2O$$

This latter reaction is of practical importance industrially since the normally very corrosive hydrofluoric acid is transformed into the less corrosive hydrofluosilicic acid.

Phosphate rock in which a significant amount of fluoride is replaced by chloride, such as in rock containing the mineral fluochlorapatite, or phosphate rock deficient in active silica can present very serious corrosion problems if it is used to manufacture phosphoric acid by the wet process method. This corrosion problem is associated with the presence of free hydrochloric and/or hydrofluoric acids dissolved in the phosphoric acid-gypsum reaction slurry. Efforts to remove the chloride contaminant economically from phosphate rock containing fluochlorapatite have been unsuccessful because the chloride is insoluble and tightly locked within the crystal lattice in what is known as channel sites.

Some phosphate ores contain other troublesome mineral species. Iron containing minerals such a hematite, $Fe_2O_3$, and geothite, $HFeO_2$, and aluminum containing minerals such as crandallite, $CaAl_3(PO_4)_2(OH)_5.3H_2O$, will dissolve in the reaction slurry during the manufacture of phosphoric acid by the wet method, yielding a phosphoric acid which is usually considered unsuitable for further processing to fertilizer products if the level of iron or aluminum contamination is too high. Generally phosphoric acid having an $(Fe_2O_3+Al_2O_3)$ to $P_2O_5$ ratio much greater than about 0.095 is considered unsuitable for the production of commercial fertilizers. Efforts to remove these contaminants from the phosphate rock before it is used for phosphoric acid manufacture generally have been only partly successful. Removal of iron and aluminum contaminants from the phosphoric acid product is often practiced, but the methods employed have resulted in major losses of phosphorous values in a waste or "raffinate" stream. This waste stream normally is of little economic value, since it is usually unsuitable for use in the manufacture of a conventional fertilizer product.

Finally, other minor mineral contaminants which occur in some phosphate rocks may cause serious problems during the manufacture of phosphoric acid by the wet process. For example, the hard mineral ilmenite, $FeTiO_3$, can cause severe abrasion to processing equipment. Manganese minerals, such as pyrolusite, $MnO_2$, contain manganese in a high oxidation state; phosphate rock containing such species can yield highly oxidative phosphoric acid which, under certain conditions, can be severely corrosive. Since these minerals rarely occur in the phosphate rocks normally used in the manufacture of phosphoric acid, methods of using phosphate rock containing these species have not been developed.

In the past, large sedimentary deposits of high grade phosphate rock have been available for the manufacture of phosphoric acid by the wet process method. Because of the relatively uniform nature of these deposits, and because they are contaminated by relatively innocuous minerals such as dolomite, silica sand and various clays, their beneficiation and use in the manufacture of phosphoric acid is well understood.

As these sedimentary deposits are mined out, the more unconventional phosphate rock deposits such as those containing fluochlorapatite, iron and aluminum mineral species will have to be exploited. Accordingly, a need exists for processes for producing and purifying phosphoric acid by the wet process without undesirable corrosive effects from these more unconventional and untapped phosphate rocks.

BRIEF DESCRIPTION OF THE DRAWINGS

For a more complete understanding of the present invention and for other obvious advantages thereof, reference is now made to the following description, taken in conjunction with the accompanying drawing in which:

FIG. 1 is a block diagram illustrating the processes of the present invention.

DISCLOSURE OF THE INVENTION

This invention is directed to a process which economically recovers phosphoric acid from phosphate rock containing fluochlorapatite and permits the removal of undesirable aluminum and iron contaminates. The invention also describes a process which permits the upgrading of phosphoric acid containing excessive iron and aluminum contaminants.

According to one embodiment of the invention, a process is disclosed for producing phosphoric acid by the wet process from phosphate rock containing fluochlorapatite. Phosphate rock containing fluochlorapatite is crushed to a size such that from about 50 to about 90% by weight will pass through a −200 mesh U.S.S. sieve. The crushed rock is mixed in a digestor with recycled phosphoric acid and sulfuric acid to form a slurry. The oxidation-reduction potential of the slurry is maintained at about +150 mv to about +750 mv by the addition of a reductant such as sulfur dioxide, ammonium bisulfite, sodium sulfite or metallic zinc, aluminum or iron. The $F/SiO_2$ ratio of the slurry is preferably maintained in the range from about 1.9 to about 2.3 to minimize corrosion. The slurry is then filtered to remove gypsum by-products therefrom to obtain a filtered phosphoric acid. A portion of the phosphoric acid is recycled and the remaining portion is concentrated to a level of from about 40% to about 54% $P_2O_5$.

According to another embodiment of the present invention, a process is disclosed for producing phosphoric acid by the wet process from a phosphate rock containing fluochlorapatite. Phosphate rock containing fluochlorapatite is crushed to a size such that from about 50% to about 90% by weight will pass through a −200 mesh U.S.S. sieve. Crushed rock is mixed in a digestor with recycled phosphoric acid and sulfuric acid to form a slurry. The oxidation-reduction potential of the slurry is maintained at about +150 mv to about +750 mv by the addition of a reductant such as sulfur dioxide, ammonium bisulfite, sodium sulfite or metallic zinc, aluminum or iron. The $F/SiO_2$ ratio of the slurry is preferentially maintained in the range from about 1.9 to about 2.3 to minimize corrosion. The slurry is filtered to remove gypsum by-products therefrom to obtain a phosphoric acid. A portion of the phosphoric acid is recycled to the digestor. If the remaining phosphoric acid contains unacceptable aluminum contamination, the acid is treated to remove excess aluminum by adding sufficient soluble sodium and fluoride containing compounds to the filtered acid to precipitate aluminum as a crystalline salt. The mixture is stirred in a reactor at a temperature less than about 70° C. for about 15 to about 60 minutes at which time the aluminum precipitate is removed from the solution to obtain an aluminum removed phosphoric acid. If the filtered acid contains unacceptable levels of iron, the acid is treated to remove excess iron by adding sufficient ammonium hydroxide to the filtered acid to precipitate iron as a crystalline salt. The mixture is allowed to age from about 2 to about 20 hours at a temperature between about 25° C. and the boiling point of the acid, at which time the iron salt precipitate is removed from the solution to obtain an iron removed phosphoric acid.

According to yet another embodiment of the present invention, a process is disclosed for reducing the aluminum content of phosphoric acid where the ratio of $Al_2O_5$ to MgO is at least about 5 to 1. Sufficient quantity of sodium and fluoride containing compound is added to the phosphoric acid to precipitate aluminum as a crystalline salt, principally in the form of $Na_2AlF_5$. The resulting mixture is then stirred for about 15 to about 60 minutes at a temperature less than about 70° C., at which time the aluminum precipitate is filtered from the mixture to obtain an aluminum removed phosphoric acid. The acid may be further concentrated to a level of from about 40% to about 54% by evaporation.

According to yet another embodiment of the present invention, a process is disclosed for reducing the iron content of phosphoric acid to a desired level. A sufficient quantity of ammonia is added to the phosphoric acid to precipitate iron as a crystalline salt, principally in the form of $NH_4Fe_2H_8(PO_4)_5.4H_2O$. The mixture is aged from about 2 to about 24 hours at temperatures between about 25° and the boiling point of the acid, at which time the iron precipitate is filtered from the mixture to obtain an iron reduced phosphoric acid. The resulting acid may be concentrated to a level of from about 40% to about 54% $P_2O_5$ by evaporation.

DETAILED DESCRIPTION OF THE INVENTION

The present invention provides a method of producing phosphoric acid by the wet process method using phosphate rock which heretofore would have been considered commercially undesirable for this purpose. Unlike more commonly used phosphate rocks, such as those obtained from Florida or Morocco, such rock might contain, for example, from 0.2% to 2.4% chloride as fluochlorapatite, from 0.4% to 9.5% $Fe_2O_3$ as hematite and geothite, from 0.2% to 3.0% $Al_2O_3$ as crandallite, from 0.1% to 0.35% $MnO_2$ as pyrolusite, and from 0.4% to 3.0% $TiO_2$ as ilmenite. Phosphate rock deposits having this general composition are found, for example, in Sri Lanka. The invention further provides for improving the quality of the phosphoric acid produced from Sri Lankan or other phosphate rock by eliminating iron and aluminum contaminants, rendering such rock suitable for use in the manufacture of fertilizer products.

FIG. 1 schematically illustrates the essential steps of the process in the preferred embodiment of the invention. As shown in FIG. 1, phosphate rock feed containing fluochlorapatite, hematite and geothite, crandallite, pyrolusite and ilmenite in the ranges described above is fed to a crusher 10 which grinds the rock to from about 50% to about 90% −200 mesh (U.S.A. Standard) size. If the rock contains more than about 2.5% ilmenite, it may be desirable, but not necessary, to pretreat the rock to remove excess ilmenite at a pretreatment stage 12 shown in FIG. 1. Removal of excess ilmenite is especially important in reducing abrasion which tends to be a problem in subsequent processing. Ilmenite can be separated from the bulk of the phosphate rock by conventional beneficiation techniques which take account of the differences in specific gravity between ilmenite and the phosphate rock. Such techniques are useful because ilmenite normally has a specific gravity of about 4.1–4.8, while most phosphate rocks have an overall specific gravity of only about 3.1–3.4. Separation of excess ilmenite at this stage is also economically advantageous because the by-product ilmenite can also be used as a source of titanium or as a source material for the production of titanium dioxide.

The ground, pretreated or untreated phosphate rock from crusher 10 is then passed into the digestor 14 of a conventional dihydrate type phosphoric acid process. Almost any conventional dihydrate type phosphoric acid process can be used to manufacture phosphoric acid from the phosphate rock described herein if certain modifications are made. Since the equipment is entirely conventional, the digestor and filter functions are represented schematically in FIG. 1, with it being understood that the details of filtration and digestion adapted to a particular application can be supplied by those skilled in the art.

Several preferred adjustments in digestor conditions are necessary to reduce the corrosiveness of the digestor slurry made from Sri Lankan phosphate rock. To control corrosion, the digestor temperature should be maintained below about 85° C., preferably between about 70° C. and about 82° C. Corrosion is further minimized by maintaining the $F/SiO_2$ weight ratio between about 1.9 and about 2.3. This ratio can be maintained by the addition of active silica, such as diatomaceous earth, to the digestor.

When phosphate rock of the Sri Lankan type described above is used to produce phosphoric acid, the addition of a reductant to adjust the oxidation reduction potential of the phosphoric acid slurry has an unexpectedly beneficial effect in terms of reducing the corrosiveness of the slurry. Phosphoric acid produced from commonly used phosphate rocks contains soluble iron in two oxidation states, Fe(II) and Fe(III). The relative proportion of the two iron species generally controls the oxidation-reduction potential of wet process phosphoric acid. Usually this potential is in the range of about +110 mv to about +230 mv, as measured using a platinum working electrode and a saturated calomel reference electrode. However, Sri Lankan phosphate rock, described above, can contain oxidative manganese minerals which assure that virtually all of the dissolved iron is oxidized to Fe(III). In fact, an excess of the manganese mineral is often present so that the phosphoric acid contains manganese as the soluble Mn(III) complex, $H_3Mn(PO_4)_2$. The presence of this complex ensures that the solution oxidation-reduction potential is always higher than about +250 mv. Generally these higher potentials help to reduce the corrosivity of the phosphoric acid, since at these potentials, metals are usually in a passive state. However, excessive levels of manganese can lead to the production of phosphoric acid which has a solution potential of +900 mv or higher. At these potentials, the acid again becomes very corrosive due to the phenomenon of transpassivity when oxidation of the oxide film or the metal which confers passivity is rendered soluble by oxidation. Therefore, phosphoric acid production plants designed to use phosphate rocks of this sort must provide for the addition of a reductant to the phosphoric acid in order to maintain the oxidation-reduction potential between about +150 mv and about +750 mv, and preferably between +250 mv and +500 mv. This reductant can be added in several ways; preferably it should be added directly into the digestor or into a recycled phosphoric acid stream.

Various reductants are suitable for use in this process: for example, metallic iron, aluminum or zinc, sodium sulfite, ammonium bisulfite or sulfur dioxide. Sulfur dioxide is the preferred reductant because as it is consumed, it is transformed into sulfuric acid, which is the major reactant being added to the digestor.

If the oxidation-reduction potentials and the other above-mentioned conditions are maintained in the digestor circuit, certain nickel-based alloys have unexpectedly been found to be suitable for use as materials of construction for all equipment which comes in contact with either the reactor slurry or the filter acid. This is true even though the chloride content of these acidic materials is as much as about 1%, a level previously considered unacceptably high for the use of most alloys. Commercially available alloys having the following composition are especially suitable:

| | |
|---|---|
| Nickel - Balance | Carbon - 0.05% maximum |
| Cobalt - 2.50% maximum | Copper - 1.50–2.50% |
| Chromium - 21.0–23.5% | Columbium + tantalum - 1.75–4.50% |
| Molybdenum - 5.5–9.5% | Phosphorous - 0.04% maximum |
| Tungsten - 1.0% | Sulfur - 0.03% maximum |
| Silicon - 1.0% maximum | Iron can be about 3%, or in the range of 18.0 to 21.0% |
| Manganese - 1.0–2.0% maximum | |

Referring once again to FIG. 1, a slurry is formed in the digestor 14 by mixing sulfuric acid, crushed, treated or untreated phosphte rock and weak (unconcentrated) phosphoric acid which is recycled to the digestor. Preferably, the reductant is added directly to the digestor at any point which would ensure good mixing with the slurry or to the recycled phosphoric acid as illustrated in FIG. 1, although it may also be added to the slurry or to a mixture of the recycled phosphoric acid and the slurry in a separate stirred vessel (not shown). As shown in FIG. 1, active silica may also be added to the digestor to maintain the $F/SiO_2$ ratio in the range of from about 1.9 to about 2.3. The digestor slurry is then fed to a filter 16, to which a water wash is added and the gypsum by-products are removed. A portion of the filter acid is recycled back via path 18 to the digestor and the remainder is usually concentrated to a level of about 40% and further processed in the conventional manner to make fertilizer materials.

When a phosphate rock having a high iron and/or aluminum content is used to produce phosphoric acid by the wet process method, the resultant phosphoric acid can contain unacceptably high levels of these two impurities. The present invention therefore provides two improved methods of removing these contaminants from the phosphoric acid. Each of these methods is designed principally for the removal of one of these impurities. Often treatment of the acid by one or the other of these processes yields a phosphoric acid of sufficient purity that it is suitable for subsequent use in fertilizer production. However, both of these processes can be used to treat an acid heavily contaminated with both impurities.

If the filter acid is heavily contaminated with aluminum and iron, which can occur when Sri Lankan phosphate rock or other rock such as phosphate rock mined in the Christmas Islands is used, the acid may be unsuitable for production of fertilizers. Accordingly, further processing may be required to upgrade the acid by selectively removing the aluminum and/or iron impurities.

As shown in FIG. 1, the filter acid may be further processed by a path 20 to remove aluminum via path 22, remove iron via path 24, or both, by first removing aluminum, then iron or by first removing iron, then aluminum.

In the aluminum removal process shown in FIG. 1, sodium and fluoride compounds are added to the filter acid in a stirred reactor 30 in such amounts that the aluminum precipitates as a crystalline salt having an approximate composition, $Na_2AlF_5$. To assure the precipitation of large, readily removable crystals of $Na_2AlF_5$, the reactants must be mixed well with the phosphoric acid. Although the reaction can be carried out batch-wise or semi-continuously, it is preferable to carry it out in a continuous fashion in stirred tank reactor 30. The residence time in this reactor should be about 15 to about 60 minutes. Although the precipitation of $Na_2AlF_5$ can be carried out at higher temperatures on the order of 70° C., more of the aluminum will be removed at lower temperatures. Accordingly, it is preferable that the reaction be carried out at temperatures in the range of from about 30° to about 50° C.

After the reaction has been carried out in reactor 30 for the requisite time, the precipitate is then filtered from the acid in a filter 32, or alternatively, removed by settling or centrifugation. Since the $Na_2AlF_5$ is fairly insoluble, the precipitate may be washed with a small amount of water to remove residual phosphoric acid.

The $Na_2AlF_5$ can be discarded, sold as a by-product or preferably decomposed to recover fluoride and/or sodium values for recycling. The filtered phosphoric acid can then be subjected to additional purification steps, can be processed to finished products, or can be subjected to the iron removal process via path 34. Phosphoric acid having a concentration from about 17% to about 54% $P_2O_5$ can be treated successfully by this process, although the process is principally designed for up-grading phosphoric acid having a concentration between about 25% and about 32% $P_2O_5$. The process is most successful when used to treat phosphoric acid containing relatively little magnesium relative to aluminum. Generally the $Al_2O_5$ to MgO ratio in the phosphoric acid should be at least about 5 to 1. If the $Al_2O_3$ to MgO ratio is too low, the salt $Na_xMg_{xAl2-x}(F,OH)_6 \cdot H_2O$ will form. This material normally precipitates as very small crystals which are extremely difficult to remove from the phosphoric acid with conventional techniques.

In order to effect precipitation of aluminum, the fluoride level must be adjusted so that the concentration of free fluoride in the phosphoric acid is at least about 1.86 times the concentration of aluminum as $Al_2O_3$. The term "free fluoride" as used herein means any ionic fluoride not complexed with silicon as the fluosilicate ion. A convenient method for calculating the total amount of fluoride that must be added to a given quantity of phosphoric acid can be calculated by using the following equation:

$$X = 1.86\ (Al_2O_3) + 1.90\ (SiO_2) - (F)$$

where:

$X$ = The amount of fluoride to be added.

$Al_2O_3$ = The amount of alumina in the phosphoric acid.

$SiO_2$ = The amount of soluble silica in the phosphoric acid.

$F$ = The total amount of fluoride already present in the phosphoric acid.

The sodium level must be adjusted so that sufficient sodium is present not only to precipitate aluminum as $Na_2AlF_5$, but also to react with the fluosilicate ion to form $Na_2SiF_6$. The amount of sodium which must be added to the phosphoric acid can be calculated by using the following formula:

$$Y = 0.90\ (Al_2O_3) + 0.76\ (SiO_2) - (Na)$$

where:

$Y$ = The amount of sodium to be added.

$Al_2O_3$ = The amount of alumina in the phosphoric acid.

$SiO_2$ = The amount of soluble silica in the phosphoric acid.

$Na$ = The total amount of sodium already present in the phosphoric acid.

Many compounds can be used to adjust the sodium and fluoride content of the phosphoric acid. Sodium levels can be adjusted by using, for example, sodium chloride, sodium sulfate, sodium carbonate and sodium hydroxide. Fluoride levels can be adjusted using hydrofluoric acid, ammonium fluoride, ammonium bifluoride or calcium fluoride. Both the sodium and fluoride levels can be adjusted by using sodium fluoride and sodium bifluoride. Generally any sodium or free fluoride containing material which dissolves in phosphoric acid is suitable, but the preferred materials are those most easily recoverable from the by-product material, $Na_2AlF_5$, or those that are inexpensive and readily available.

The second add-on process for upgrading wet process phosphoric acid is designed to remove iron as an insoluble, crystalline salt having a composition approximately represented by the formula, $NH_4Fe_2H_8(PO_4)_5 \cdot 4H_2O$. As shown in FIG. 1, this process is carried out by adding a small amount of ammonia to the filtered phosphoric acid from filter 16 via path 24 or from aluminum removed acid from filter 32. The mixture is allowed to age in a stirred reactor 40 during which time the iron containing precipitate forms crystals which are easily removed from the acid by filtration, settling or centrifugation. The precipitation reaction can be carried out from about 25° C. to the boiling point of the phosphoric acid. However, the precipitation reaction proceeds most rapidly to give an easily filterable precipitate between the ranges of from about 50° C. to about 110° C., even more preferably between about 70° C. and about 95° C. Prior to filtration, the reaction mixture can be optionally cooled to from about 30° C. to about 50° C. to effect more complete precipitation of the iron. The aging time required to effect good crystallization of the precipitate is from about 2 to about 24 hours, preferentially between about 8 and about 20 hours. The exact aging time is dependent upon the phosphoric acid composition and temperature, and is best determined for each different type of phosphoric acid.

When the mixture has aged in the stirring reactor 40 for the requisite time, it is passed into the filter 42 where the solid iron-containing phase is removed by filtration; the solid phase then can be optionally washed with a small amount of water to remove as much of the residual phosphoric acid as possible. Since the $P_2O_5$ content of the precipitate is mostly soluble in neutral ammonium citrate solution, it can be considered a valuable available plant nutrient. Thus, the solid can be processed to a fertilizer by drying or ammoniation. Alternatively, the precipitate can be removed from the phosphoric acid by centrifugation.

Following removal of the iron precipitate, the iron removed acid which typically has a concentration of about 27–28% $P_2O_5$ is passed to a concentrator 44 where the concentration is increased from about 40% to about 54% $P_2O_5$ by evaporation. If the filter acid is processed first to remove iron and further processing is desired to remove aluminum, the iron reduced acid is then sent to stirred reactor 30 via path 46 and is processed to remove aluminum impurities as described above.

Generally, it is best to reduce the iron content of heavily contaminated phosphoric acid to just below a level typical for phosphoric acid produced from Florida phosphate rock. For 30% $P_2O_5$ Florida type of phosphoric acid, the $Fe_2O_3$ content is usually about 0.9% to about 1.3%. If the iron removal is thus limited, the residual level of ammoniacal nitrogen left in the phosphoric acid will be less than about 1%, and the generation of the iron containing byproduct can be minimized. The amount of ammonia which must be added to the phosphoric acid in order to achieve a desired residual iron level can be estimted using the following relation:

$$A = 0.126\ (I_i - I_f) + \frac{5.96 \times 10^{-5}\ (W^2)}{I_F}$$

where:

A=The amount of ammonia required.

$I_i$=The initial amount of iron present (as Fe).

$I_f$=The final amount of residual iron desired (as Fe).

W=The total weight of acid to be treated. The residual amount of ammoniacal nitrogen which will remain in the treated acid after removal of the iron precipitate can be estimated by the following formula:

$$N = \frac{4.91 \times 10^{-3}(W)}{I_f}$$

where:

N=Residual amount of ammoniacal nitrogen.

$I_f$=The final amount of residual iron.

W=The total weight of acid treated.

The amount of $P_2O_5$ removed with the iron can be estimated using the following equation:

$$P = 3.42\,(I_i - I_f)$$

where:

P=The amount of $P_2O_5$ that will be removed with the iron.

$I_i$=The initial amount of iron in the phosphoric acid.

$I_f$=The final amount of iron in the phosphoric acid.

The following examples ilustrate the invention without limiting its scope in any way:

EXAMPLE 1

A phosphate rock was roughly crushed and then was ground in a ball mill to the following screen size:

| Screens | Percent of Total |
|---|---|
| +35 | 2.6 |
| −35, +100 | 20.0 |
| −100, +200 | 15.6 |
| −200 | 61.8 |

After grinding the rock was found to have the following analysis:

| Component | Percent |
|---|---|
| $P_2O_5$ | 33.70 |
| CaO | 43.60 |
| $Fe_2O_3$ | 7.54 |
| $Al_2O_3$ | 1.91 |
| Cl | 1.04 |
| F | 2.10 |
| MgO | 0.025 |
| $MnO_2$ | 0.316 |
| $Na_2O$ | 0.155 |
| $FeTiO_2$ (ilmenite) | 3.97 |

This rock was used to prepare phosphoric acid in a single tank, pilot phosphoric acid unit during a 98 hour continuous acidulation test. An impeller constructed of the alloy, Haselloy G, was used to stir the reaction slurry; the tip speed of the impeller blade was maintained between 2.2 and 4.3 meters/second throughout the test. The impeller blade was weighed at the beginning and at the end of the test in order to determine the weight of metal lost due to corrosion plus abrasion. Corrosion rates were also measured during the test using a Petrolite Model 103 Corrosion Meter.

During the test, the digestor temperature was maintained between 70° C. and 73° C.; free sulfate was held between 1.02% and 1.56%; the concentration of the phosphoric acid produced was held between 27.23% $P_2O_5$ to 29.09% $P_2O_5$. The oxidation-reduction potential of the slurry was maintained between +301 mv and +456 mv by the addition of sulfur dioxide gas directly into the stirred reaction mixture.

At the end of the test, the Hastelloy G impeller showed a corrosion-erosion weight loss equivalent to 37 mils per year. Most of the loss was caused by abrasive action due to the high ilmenite content of this ore; corrosion measurements using a corrosion meter indicated a corrosion rate of only 5 mils per year, even though the phosphoric acid produced had an average chloride content of 0.82%. No pitting-type corrosion was observed.

EXAMPLE 2

To demonstrate the effect of using a rock having a lower ilmenite and manganese content, a phosphoric acid pilot test was carried out as in Example 1, but a rock having the following composition was used.

| Component | Percent |
|---|---|
| $P_2O_5$ | 35.04 |
| CaO | 46.89 |
| $Fe_2O_3$ | 4.52 |
| $Al_2O_3$ | 1.79 |
| Cl | 1.11 |
| F | 2.65 |
| MgO | 0.04 |
| $MnO_2$ | 0.131 |
| $Na_2O$ | 0.179 |
| $FeTiO_3$ (ilmenite) | 2.05 |

The rock was ground to give the following screen analysis:

| Screens | Percent of Total |
|---|---|
| +35 | 6.6 |
| −35, +100 | 20.5 |
| −100, +200 | 19.4 |
| −200 | 53.5 |

During the test, the digestor temperature was held between 68° C. and 73° C.; free sulfate averaged 2.87%, and the concentration of the phosphoric acid produced averaged 29.15%. The oxidation-reduced potential of the slurry ranged from +370 mv to +660 mv. The Hastelloy G impeller showed a corrosion-erosion weight of only 4.24 mils per year; no pitting of the metal was observed, even though the chloride content of the phosphoric acid averaged 0.609%.

EXAMPLE 3

To demonstrate the effect of raising the temperature of the digestor slurry, a test as in Example 2 was carried out, except that the digestor temperature was raised to between 76° C. and 83° C. In addition, a second impeller constructed of Inconel 625 was also tested. The corrosion rates for the Hastelloy G and Inconel 625 impellers were found to be 6.67 mils per year and 8.35 mils per year, respectively.

EXAMPLE 4

To demonstrate the use of a rock having a higher manganese content, where the oxidation-reduction potential was uncontrolled, a rock sample having the following composition was tested:

| Component | Percent |
|---|---|
| $P_2O_5$ | 37.39 |
| CaO | 50.54 |
| $Fe_2O_3$ | 2.70 |
| $Al_2O_3$ | 0.73 |
| Cl | 1.09 |
| F | 2.40 |
| MgO | 0.071 |
| $MnO_2$ | 0.261 |
| $Na_2O$ | 0.15 |
| $FeTiO_3$ (ilmenite) | 2.53 |

The test was carried out as in Example 2, except the oxidation-reduction potential was not controlled by addition of sulfur dioxide. The potential rose to as high as +950 mv. The corrosion rates for the Hastelloy G and Inconel 625 impellers were found to be 11.71 mils per year and 15.77 mils per year, respectively.

EXAMPLE 5

In order to demonstrate the process designed to remove aluminum, wet process phosphoric acid of the following composition was treated:

| Component | Percent |
|---|---|
| $P_2O_5$ | 26.67 |
| $Fe_2O_3$ | 2.41 |
| $Al_2O_3$ | 2.06 |
| MgO | 0.051 |
| F | 1.51 |
| $Na_2O$ | 0.1 |

Sodium fluoride (26.0 grams) and 50% hydrofluoric acid (21.0 grams) were added to 500 grams of the phosphoric acid at 70° C. A fine white precipitate immediately formed. Continued stirring and cooling to 25° C. resulted in further precipitation and thickening of the slurry. The solid was removed by filtration; subsequently the solid was reslurried with water, filtered and dried at 80° C. The treated acid had the following composition:

| Component | Percent |
|---|---|
| $P_2O_5$ | 25.05 |
| $Fe_2O_3$ | 2.33 |
| $Al_2O_3$ | 0.017 |
| MgO | nil |
| F | 0.94 |
| $Na_2O$ | 0.64 |

The precipitated solid had the following composition:

| Component | Percent |
|---|---|
| F | 42.89 |
| Na | 23.29 |
| Al | 12.43 |
| Mg | 0.27 |
| $P_2O_5$ | 6.64 |
| Ca | 0.62 |

The $P_2O_5$ co-precipitated with the solid represents only about 4% of the total $P_2O_5$ present in the starting phosphoric acid.

EXAMPLE 6

A continuous pilot unit designed for the removal of aluminum from phosphoric acid was operated for 5 hours. Sodium fluoride and hydrofluoric acid were added to phosphoric acid having the following composition:

| Component | Percent |
|---|---|
| $P_2O_5$ | 29.82 |
| $Al_2O_3$ | 1.68 |
| $Fe_2O_3$ | 2.48 |
| $Na_2O$ | 0.12 |
| F | 1.44 |

Fluoride was added at the rate of between 3.58 and 3.64 grams of F per 100 grams of phosphoric acid; sodium was added at the rate of between 1.82 and 1.91 grams of sodium per 100 grams of phosphoric acid. Hydrofluoric acid was added to the phosphoric acid prior to being pumped to the reactor-crystallizer; sodium fluoride was added to the agitated reactor by a vibrating trough feeder. The reactor vessel was maintained at a temperature between 60° and 65° C.

The overflow from the reactor entered a stirred vessel maintained at 40° C. Slurry was periodically removed from this vessel and filter to remove the crystalline precipitate. The average residence time of the phosphoric acid in this pilot unit was about 45 minutes. The treated phosphoric acid has the following composition:

| Component | Percent |
|---|---|
| $P_2O_5$ | 29.08 |
| $Al_2O_3$ | 0.05 |
| $Fe_2O_3$ | 2.48 |
| $Na_2O$ | 0.34 |
| F | 1.12 |

The aluminum containing precipitate had the following analysis:

| Component | Percent |
|---|---|
| Na | 20.91 |
| Al | 13.54 |
| F | 42.40 |
| $P_2O_5$ | 7.41 |
| Ca | 1.15 |
| Fe | 0.54 |
| Mg | 0.27 |
| K | 0.21 |

EXAMPLE 7

The untreated phosphoric acid used in Example 6 was ammoninated and dried to give a diammonium phosphate material having the following composition:

| Component | Percent |
|---|---|
| N | 16.5 |
| $P_2O_5$ | 45.7 |
| $H_2O$ | 2.0 |

The treated phosphoric acid produced in Example 6 was ammoniated and dried to give a diammonium phosphate material having the following composition:

| Component | Percent |
|---|---|
| N | 17.9 |
| $P_2O_5$ | 46.5 |
| $H_2O$ | 2.0 |

This illustrates the improvement in analysis obtainable in fertilizer materials produced from phosphoric acid treated by the aluminum removal process.

EXAMPLE 8

To demonstrate the iron removal process, wet process phosphoric acid having the following composition was treated:

| Component | Percent |
|---|---|
| N | none |
| $P_2O_5$ | 29.72 |
| Fe | 2.38 |
| Al | 0.77 |

Ammonium hydroxide solution (24% $NH_3$, 36 grams) was added to 1400 grams of the phosphoric acid with stirring. The mixture is then brought to 80° C. and at this temperature for 16 hours; the reaction vessel was equipped with a reflux condenser to minimize moisture loss. At the end of this time, the mixture was allowed to cool to room temperature; it was then filtered to remove the pinkish crystalline precipitate which had formed. The precipitate weighed 139 grams. The phosphoric acid weighed 1220 grams and had the following analysis:

| Component | Percent |
|---|---|
| N | 0.38 |
| $P_2O_5$ | 28.40 |
| Fe | 0.90 |
| Al | 0.69 |

The crystalline precipitate had the following analysis:

| Component | Percent |
|---|---|
| N | 1.66 |
| $P_2O_5$ | 48.3 |
| Fe | 15.7 |
| Al | 1.21 |

EXAMPLE 9

Phosphoric acid containing 29.36% $P_2O_5$, 2.15% Fe and 0.75% Al was treated by the method outlined in Example 8, except that only 20 grams of ammonium hydroxide solution was used, and the mixture was held at 80° C. for only 12 hours. At this level of treatment, the $P_2O_5$ loss into the precipitate phase was limited to about 6.5% of the total. The treated acid contained 29.72% $P_2O_5$, 1.70% Fe and 0.75% Al.

Ammoniation of the untreated acid, followed by drying to a solid, gave a material having the following analysis:

| Component | Percent |
|---|---|
| N | 16.3 |
| $P_2O_5$ | 45.8 |
| $H_2O$ | 2.0 |

Ammoniation of the treated acid, followed by drying, gave a solid having the following analysis:

| Component | Percent |
|---|---|
| N | 16.6 |
| $P_2O_5$ | 46.3 |
| $H_2O$ | 2.3 |

The crystalline by-product material had the following analysis:

| Component | Percent |
|---|---|
| N | 1.07 |
| total $P_2O_5$ | 47.2 |
| water soluble $P_2O_5$ | 19.3 |
| citrate-insoluble $P_2O_5$ | 11.2 |
| Fe | 11.7 |
| Al | 0.89 |

Since most of the $P_2O_5$ present in the by-product can be considered available plant nutrient, it is a useful fertilizer material. Thus only about 1.5% of the $P_2O_5$ in the original phosphoric acid can be considered to be lost in a nonuseful form.

We claim:

1. A process for producing phosphoric acid from phosphate rock containing fluochlorapatite, comprising the steps of:
   (a) crushing the phosphate rock to a size such that from about 50% to about 90% by weight thereof will pass a −200 mesh U.S.S. sieve;
   (b) mixing the rock crushed in step (a) with sulfuric acid and recycled phosphoric acid to form a slurry;
   (c) adding a reductant to the digestor slurry formed in step (b) to maintain the oxidation-reduction potential of said slurry in the range from about +150 mv to about +750 mv; and
   (d) filtering the resulting slurry of step (c) to remove gypsum by-products therefrom to obtain a phosphoric acid.

2. The process of claim 1 further comprising the steps of:
   (e) recycling a portion of the acid obtained in step (d); and
   (f) concentrating the unrecycled portion of said acid obtained in step (d) to a level of about 40% to about 54% $P_2O_5$.

3. The process of claim 1 wherein sufficient quantity of reductant is added in step (c) to maintain the oxidation-reduction potential of said slurry from about +250 mv to about +500 mv.

4. A process for producing phosphoric acid from phosphate rock containing fluochlorapatite, comprising the steps of:
   (a) crushing the fluochlorapatite containing phosphate rock to a size such that from about 50% to about 90% by weight thereof will pass a −200 mesh U.S.S. sieve;
   (b) mixing the rock crushed in step (a) with sulfuric acid and recycled phosphoric acid to form a slurry;

(c) filtering the resulting slurry of step (b) to remove gypsum by-products therefrom to obtain a phosphoric acid; and (d) adding sufficient reductant to a portion of the phosphoric acid obtained in step (c) to be recycled to the digestor to maintain the oxidation-reduction potential of the slurry formed in step (b) from about +150 mv to about +750 mv.

5. The process of claim 4 further comprising the step of:

(e) concentrating the unrecycled portion of the phosphoric acid in step (d) to a level of about 40% to about 54% $P_2O_5$.

6. The process of claim 4 wherein a sufficient quantity of reductant is added in step (d) to maintain the oxidation-reduction potential of said slurry from about +250 mv to about +500 mv.

7. The process of claim 1 or 4 wherein the reductant is metallic iron.

8. The process of claim 1 or 4 wherein the reductant is metallic aluminum.

9. The process of claim 1 or 4 wherein the reductant is metallic zinc.

10. The process of claim 1 or 4 wherein the reductant is sodium sulfite.

11. The process of claim 1 or 4 wherein the reductant is ammonium bisulfite.

12. The process of claim 1 or 4 wherein the reductant is sulfur dioxide.

13. The process of claim 1 or 4 wherein sufficient active silica is added to the slurry to maintain the $F/SiO_2$ weight ratio of said slurry from about 1.9 to about 2.3.

14. The process of claim 1 or 4 wherein the temperature of said slurry is maintained below about 78° C. prior to filtering of the gypsum by-products therefrom.

15. The process of claim 14 wherein the temperature of said slurry is maintained in a range from about 70° C. to about 85° C. prior to filtering of the gypsum by-products therefrom.

16. The process of claim 1 or 4 further comprising the steps of:

(g) treating the phosphoric acid obtained in step (d) to remove excess aluminum by adding sufficient soluble sodium and fluoride containing compounds to said phosphoric acid to precipitate aluminum from said solution as a crystalline salt; and (h) removing said aluminum precipitate from the solution of step (g) to obtain an aluminum removed phosphoric acid.

17. The process of claim 16 wherein the amount of fluoride (X) added in step (g) is determined by the relation: $X=1.86\ (Al_2O_3)+1.90\ (SiO_2)-(F)$ and the amount of sodium containing material (Y) is determined by the relation: $Y=0.90\ (Al_2O_3)+0.76\ (SiO_2)-(Na)$, where $Al_2O_3$ is the amount of alumina in the phosphoric acid, $SiO_2$ is the amount of soluble silica in the phosphoric acid, F is the total amount of fluoride already present in the phosphoric acid and Na is the total amount of sodium present in the phosphoric acid.

18. The process of claim 16 wherein the fluoride containing compound added in step (g) is hydrofluoric acid, ammonium fluoride, ammonium bifluoride or calcium fluoride.

19. The process of claim 16 wherein the sodium containing compound added in step (g) is sodium chloride, sodium sulfate, sodium carbonate or sodium hydroxide.

20. The process of claim 16 wherein the sodium and fluoride containing compounds added in step (g) are sodium fluoride or sodium bifluoride.

21. The process of claim 16 wherein the reaction in step (g) is carried out in a stirred reactor for a period from about 15 to about 60 minutes.

22. The process of claim 16 wherein the reaction in step (g) is carried out at a temperature below about 70° C.

23. The process of claim 22 wherein the reaction in step (g) is carried out at a temperature in the range from about 30° C. to about 50° C.

24. The process of claim 1 or 4 further comprising the steps of:

(i) treating the filtered phosphoric acid obtained in step (d) to remove excess iron by adding a sufficient quantity of ammonia to precipitate iron as an insoluble crystalline salt; and (j) removing the iron precipitate from the solution in step (i) to obtain an iron reduced phosphoric acid.

25. The process of claim 24 wherein the amount of ammonia added in step (i) is determined by the relation $$A = 0.126(I_i - I_f) + \frac{5.96 \times 10^{-5}(W^2)}{I_f}$$

where A is the amount of ammonia required, $I_i$ is the initial amount of iron present (as Fe), $I_f$ is the final amount of residual iron desired (as Fe), and W is the total weight of acid to be treated.

26. The process of claim 24 wherein step (i) is carried out in a stirred reactor for a period of from about 2 to about 24 hours.

27. The process of claim 26 wherein the process is carried out from about 3 to about 20 hours.

28. The process of claim 24 wherein step (i) is carried out at a temperature in the range from about 50° C. to about 110° C. and prior to removing the precipitate in step (j), the mixture is cooled to a temperature in the range from about 30° C. to about 50° C.

29. The process of claim 24 wherein step (i) is carried out at a temperature in the range from about 70° C. to about 95° C.

30. A process for producing phosphoric acid from phosphate rock containing from about 0.2% to about 2.4% chloride as fluochlorapatite, from about 0.4% to about 9.5% $Fe_2O_3$ as hematite and geothite, from about 0.2% to about 3.0% $Al_2O_3$ as crandellite, from about 0.1% to about 0.35% $MnO_2$ as pyrolusite, and from about 0.4% to about 3.0% $TiO_2$ as ilmenite, comprising the steps of:

(a) crushing the phosphate rock to a size such that from about 50% to about 90% by weight thereof will pass a −200 mesh U.S.S. sieve;

(b) mixing the rock crushed in step (a) with sulfuric acid and recycled phosphoric acid to form a slurry;

(c) adding a reductant to the slurry formed in step (b) to maintain the oxidation-reduction potential in the range from about +150 mv to about +750 mv, wherein said reductant is metallic iron, aluminum or zinc, sodium sulfite, ammonium bisufite or sulphur dioxide;

(d) adding sufficient active silica to the digestor slurry obtained in step (b) to maintain the $F/SiO_2$ weight ratio of said slurry between 1.9 and 2.3;

(e) filtering the resulting slurry of step (d) to remove gypsum by-products therefrom to obtain a phosphoric acid;

(f) treating the phosphoric acid obtained in step (e) to remove excess aluminum by adding sufficient soluble sodium and fluoride containing compounds to said phosphoric acid to precipitate aluminum as a crystalline salt, when the aluminum content of the acid obtained in step (e) is unacceptably high;

(g) removing the aluminum precipitate from the solution of step (f) to obtain an aluminum removed phosphoric acid;

(h) treating the phosphoric acid obtained in step (e) to remove excess iron by adding sufficient ammonia to the filtered acid to precipitate iron as a crystalline salt, when the level of iron in the acid obtained in step (e) is unacceptably high;

(i) removing the iron precipitate from the solution of step (h) to obtain an iron reduced phosphoric acid; and (j) concentrating the acid obtained in steps (e)–(i) to a value of about 40% to about 54% $P_2O_5$.

31. The process of claim 30 wherein the fluoride containing compound in step (f) is hydrofluoric acid, ammonium fluoride, ammonium bifluoride or calcium fluoride and the sodium containing compound in step (f) is sodium chloride, sodium sulfate, sodium carbonate or sodium hydroxide.

32. The process of claim 30 wherein the sodium and fluoride containing compounds used in step (f) are sodium fluoride or sodium bifluoride.

33. The process of claim 30 wherein the amount of fluoride added in step (f) is determined by the relation: $X=1.86\ (Al_2O_3)+1.90\ (SiO_2)-(F)$ and the amount of sodium added in step (f) is determined by the relation: $Y=0.90\ (Al_2O_3)+0.76\ (SiO_2)-(Na)$, where $Al_2O_3$ is the amount of alumina in the phosphoric acid, $SiO_2$ is the amount of soluble silica in the phosphoric acid, F is the total amount of fluoride already present in the phosphoric acid and Na is the total amount of sodium present in the phosphoric acid.

34. The process of claim 30 wherein the amount of ammonia added in step (h) is determined by the relation:

$$A = 0.126(I_i - I_f) + \frac{5.96 \times 10^{-5}(W^2)}{I_f}$$

where A is the amount of ammonia required, $I_i$ is the initial amount of iron present (as Fe), $I_f$ is the final amount of residual iron desired (as Fe) and W is the total weight of acid to be treated.

35. The process of claim 30 wherein steps (b)–(c) are carried out at a temperature below 78° C., step (f) is carried out at a temperature below about 70° C., and step (h) is carried out at a temperature in the range of from about 50° C. to about 110° C.

36. The process of claim 35 wherein steps (b)–(e) are carried out at temperatures in the range from about 70° C. to about 85° C., step (f) is carried out at temperatures in the range from about 30° C. to about 50° C., step (h) is carried out at temperatures in the range from about 70° C. to about 95° C. and the mixture obtained in step (h) is allowed to cool to a temperature of from about 30° C. to about 50° C. prior to carrying out step (i).

37. The process of claim 30 wherein sufficient reductant is added in step (c) to maintain the oxidation-reduction potential of the slurry in the range from about +250 mv to about +500 mv.

38. The process of claim 30 wherein the crushed rock of step (c) is pretreated prior to step (b) to reduce the ilmenite content below about 2.5%.

39. A process for reducing the aluminum content of phosphoric acid having a $P_2O_5$ concentration from about 17% to about 54%, wherein the ratio of $Al_2O_5$ to MgO is at least 5 to 1, comprising the steps of:

(a) adding sufficient sodium and fluoride containing compounds to the phosphoric acid to precipitate aluminum as a crystalline salt principally in the form of $Na_2AlF_5$, wherein the amount of fluoride added is determined by the relation $X=1.86\ (Al_2O_3)+1.90\ (SiO_2)-(F)$ and the amount of sodium containing material (Y) is determined by the relation $Y=0.90\ (Al_2O_3)+0.76\ (SiO_2)-(Na)$ where $Al_2O_3$ is the amount of alumina in the phosphoric acid, $SiO_2$ is the amount of soluble silica in the phosphoric acid, F is the total amount of fluoride already present in the phosphoric acid and Na is the total amount of sodium present in the phosphoric acid;

(b) stirring the mixture obtained in step (a) from about 15 to about 60 minutes at a temperature less than about 70° C.; and (c) filtering the aluminum precipitate from the mixture of step (b) to obtain an aluminum removed phosphoric acid.

40. The process of claim 39 further comprising the step of:

(d) concentrating the acid obtained in step (c) by evaporation to a level of about 40% to about 54% $P_2O_5$.

41. The process of claim 39 wherein step (b) is carried out at a temperature in the range from about 30° C. to about 50° C.

42. The process of claim 39 wherein the sodium containing compound added in step (a) is sodium chloride, sodium sulfate, sodium carbonate or sodium hydroxide.

43. The process of claim 39 wherein the fluoride containing compound is hydrofluoric acid, ammonium fluoride, ammonium bifluoride or calcium fluoride.

44. The process of claim 39 wherein the sodium and fluoride containing compounds in step (a) are sodium fluoride or sodium bifluoride.

45. A process for reducing the iron content of phosphoric acid to a desired level, comprising the steps of:

(a) adding sufficient ammonia to the phosphoric acid to precipitate iron as a crystalline salt, principally in the form of $NH_4Fe_2H_8(PO_4)_5.4H_2O$, where the amount of ammonia to be added is determined by the relation:

$$A = 0.126(I_i - I_f) + \frac{5.96 \times 10^{-5}(W^2)}{I_f}$$

where A is the amount of ammonia required, $I_i$ is the initial amount of iron present (as Fe), $I_f$ is the final amount of residual iron desired (as Fe) and W is the total weight of the acid to be treated;

(b) aging the mixture obtained in step (a) from about 2 to about 24 hours at a temperature from about 25° C. to about the boiling point of said acid; and (c) filtering the iron precipitate from the mixture of step (b) to obtain an iron reduced phosphoric acid.

46. The process of claim 45 further comprising the step of:

(d) concentrating phosphoric acid obtained in step (c) by evaporation to a level of about 40% to about 54%.

47. The process of claim 45 wherein step (b) is carried out for a period of about 3 to about 20 hours.

48. The process of claim 45 wherein step (b) is carried out at temperatures in the range from about 50° C. to about 110° C.

49. The process of claim 45 wherein step (b) is carried out at temperatures in the range from about 70° C. to about 95° C.

50. The process of claim 45 wherein the mixture of step (b) is allowed to cool to a temperature in the range from about 30° C. to about 50° C.

* * * * *